US009197555B2

(12) United States Patent
Shimonishi et al.

(10) Patent No.: US 9,197,555 B2
(45) Date of Patent: Nov. 24, 2015

(54) COMMUNICATION SYSTEM, CONTROLLER, NODE CONTROLLING METHOD AND PROGRAM (75) Inventors: Hideyuki Shimonishi, Tokyo (JP); Takeharu Yasuda, Tokyo (JP); Yuki Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 257 days.

(21) Appl. No.: 13/817,979

(22) PCT Filed: Aug. 22, 2011

(86) PCT No.: PCT/JP2011/004647
§ 371 (c)(1),
(2), (4) Date: Feb. 20, 2013

(87) PCT Pub. No.: WO2012/023292
PCT Pub. Date: Feb. 23, 2012

(65) Prior Publication Data
US 2013/0148666 A1  Jun. 13, 2013

(30) Foreign Application Priority Data

Aug. 20, 2010 (JP) ................. 2010-185428

(51) Int. Cl.
*H04L 12/721* (2013.01)
*H04L 12/741* (2013.01)
(Continued)

(52) U.S. Cl.
CPC ............ *H04L 45/72* (2013.01); *H04L 12/6418* (2013.01); *Y02B 60/43* (2013.01)

(58) Field of Classification Search
None
See application file for complete search history.

(56) References Cited

U.S. PATENT DOCUMENTS

| 5,946,313 A | 8/1999 | Allan et al. |
| 6,101,188 A * | 8/2000 | Sekine et al. ................. 370/401 |
| 6,181,680 B1 | 1/2001 | Nagata et al. |

(Continued)

FOREIGN PATENT DOCUMENTS

| CN | 101414972 A | 4/2009 |
| CN | 101615989 A | 12/2009 |

(Continued)

OTHER PUBLICATIONS

OpenFlow Switch Specification v. 1.0.0, Dec. 31, 2009.*

(Continued)

*Primary Examiner* — Ayaz Sheikh
*Assistant Examiner* — Tarell Hampton
(74) *Attorney, Agent, or Firm* — McGinn IP Law Group, PLLC.

(57) ABSTRACT

A configuration of a communication system that is able to effect packet forwarding in accordance with an intended forwarding path even in an environment where a node represented by a Layer-2 switch (L2SW) and a node represented by an OpenFlow switch exist together, is provided. The communication system includes a first node, such as a Layer-2 switch, a plurality of second nodes, equivalent to the OpenFlow switches, and a controller. The controller causes the first node to receive a destination learning packet from one of the second nodes lying on the downstream side of the first node on a preset packet forwarding path. The destination learning packet has a node lying on the downstream side of the first node as a transmission source, so that the controller causes the first node to perform a packet forwarding operation in accordance with the packet forwarding path.

12 Claims, 10 Drawing Sheets (51) Int. Cl.
*H04L 12/46* (2006.01)
*H04L 12/64* (2006.01)

(56) References Cited

U.S. PATENT DOCUMENTS

| | | | |
|---|---|---|---|
| 6,577,625 B1* | 6/2003 | Chiou et al. | 370/381 |
| 6,728,261 B1 | 4/2004 | Sasson et al. | |
| 7,756,027 B1 | 7/2010 | Reddy et al. | |
| 7,843,812 B2 | 11/2010 | Kobatake | |
| 8,687,519 B2* | 4/2014 | Takacs | 370/254 |
| 2003/0174715 A1 | 9/2003 | Yazaki et al. | |
| 2008/0189769 A1 | 8/2008 | Casado et al. | |
| 2008/0298371 A1 | 12/2008 | Kobatake | |
| 2009/0006650 A1 | 1/2009 | Saito | |
| 2009/0041038 A1 | 2/2009 | Martini et al. | |
| 2009/0052431 A1 | 2/2009 | Kroener et al. | |
| 2009/0138577 A1* | 5/2009 | Casado et al. | 709/220 |
| 2010/0111080 A1 | 5/2010 | Tiwana et al. | |
| 2010/0166420 A1 | 7/2010 | Chung et al. | |
| 2011/0164503 A1* | 7/2011 | Yong et al. | 370/237 |

FOREIGN PATENT DOCUMENTS

| | | |
|---|---|---|
| JP | 2008-301003 A | 12/2008 |
| JP | 2009-010668 A | 1/2009 |
| JP | 2010-161473 A | 7/2010 |
| WO | WO2008/095010 A1 | 8/2008 |

OTHER PUBLICATIONS

International Search Report in PCT/JP2011/0046475 dated Oct. 11, 2011 (English Translation Thereof).

Nick McKeown et al., "OpenFlow: Enabling Innovation in Campus Networks", (online), (retrieved on Jul. 6, 2010), Internet <URL: http://www.openflowswitch.org//documents/openflow-wp-latest.pdf>.

"OpenFlow Switch Specification" Version 1.0.0. (Wire Protocol 0x01) (retrieved on Jul. 6, 2010), Internet <URL: http://vvww.openflowswitch.org/documents/openflow-spec-v1.0.0.pdf>.

Nishihara et al., "Introduction to OpenFlow Techonology," Johoshori, Aug. 15, 2010, vol. 51, No. 8, pp. 1023-1029.

Chinese Office Action dated Sep. 30, 2014 with an English translation thereof.

You Jiang, et al., "Studying Finding and Aging the MAC Address in the two-layer Switch," "Software Tribune", vol. 20, Oct. 23, 2005, pp. 40-42, with an English Abstract.

Mingge Li, et al., "Science and Technology Innovation Herald", vol. 36, Dec. 21, 2007, pp. 28-29.

United States Office Action dated Oct. 2, 2014 in co-pending U.S. Appl. No. 13/818,012.

* cited by examiner

Header Fields; MATCHING RULE

| Ingress Port | Ether SA | Ether DA | Ether type | VLAN ID | VLAN Priority | IP SA | IP DA | IP protocol | IP ToS bits | TCP/UDP src port | TCP/UDP dst port | Counters | Actions |

FIG. 10

COMMUNICATION SYSTEM, CONTROLLER, NODE CONTROLLING METHOD AND PROGRAM

CROSS-REFERENCES TO RELATED APPLICATION

The present Application claims priority based upon JP Patent Application No. 2010-185428 filed in Japan on Aug. 20, 2010, the entire of the contents disclosed therein being incorporated herein by reference thereto.

TECHNICAL FIELD

This invention relates to a communication system, a controller, a node controlling method and a program. More particularly, it relates to a communication system including a network node that forwards a packet by referencing an entry and a further network node that forwards an incoming packet in accordance with a set of processing rules (i.e., packet handling operations). The entry correlates a port of the first-stated network node with the address information of the further network node to which the packet is forwarded from the above mentioned port. A set of packet handling operations correlates the processing applied to the packet with a matching rule that identifies the packet as a subject of the processing. This invention also relates to a controller, a node control method and a program.

BACKGROUND ART

Recently, a technique termed Open-Flow has been proposed (see Patent Literature 1 and Non-Patent Literatures 1 and 2). The OpenFlow comprehends communication as an end-to-end flow and effects path control, recovery from malfunctions, load distribution and optimization on the flow-by-flow basis. The OpenFlow switch, operating as a relaying device, includes a secure channel for communication with an OpenFlow controller that is to operate as controller. The OpenFlow switch is in operation in accordance with a flow table the addition in or the rewriting of which is commanded from time to time by the OpenFlow controller. In the flow table, a set of a matching rule (header field) for matching against a packet header, flow statistics information (Counters) and actions, are defined on the flow-by-flow basis (see FIG. 9). The actions define contents of the processing applied to the packet that has matched to the matching rule (Header Fields).

Figure 9:
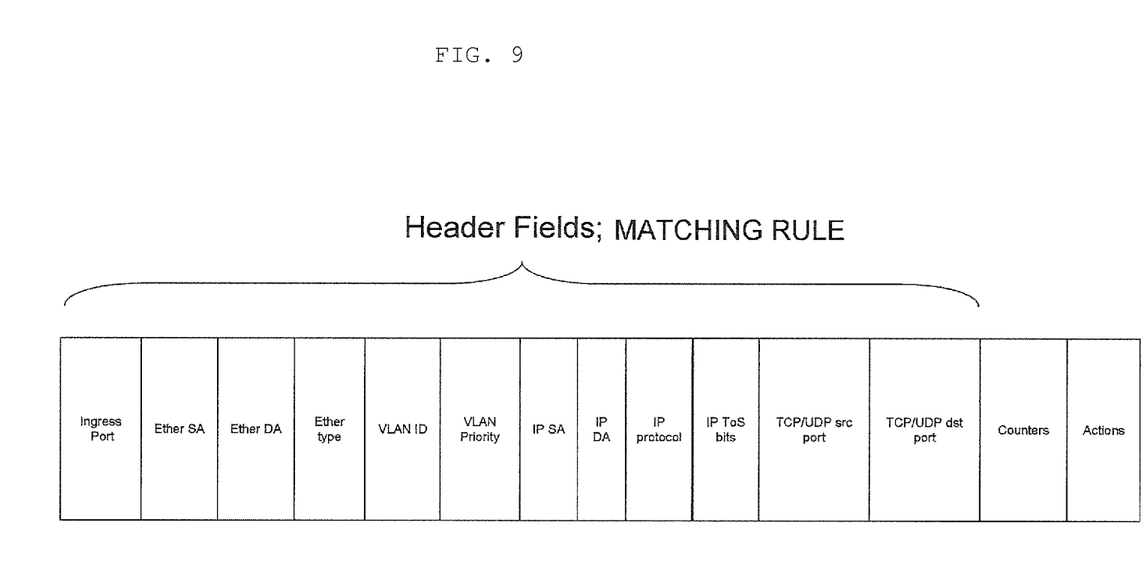
FIG. 9 is a diagrammatic view showing the configuration of a flow entry disclosed in Non-Patent Literature 2.

On receipt of a packet, the OpenFlow switch retrieves the flow table for an entry having the matching rule that matches to the packet's header information (see the header field of FIG. 9). If, as a result of the retrieval, the entry that matches to the incoming packet has been found, the OpenFlow switch updates the flow statistics information (Counters). The OpenFlow switch also applies to the incoming packet the processing of contents stated in an action field of the entry, such as transmission of the packet from the specified port, flooding or discarding (drop). If, as a result of the above mentioned retrieval, no entry that matches to the incoming packet has been found, the OpenFlow switch forwards the incoming packet to the OpenFlow controller, over the secure channel, with a request to the controller to decide on a forwarding path for the packet based upon the source as well as the destination of transmission of the incoming packet. The OpenFlow switch then receives the implementing flow entry to update the flow table. In this manner, the OpenFlow switch forwards the packet, using the entry, stored in the flow table, as the set of packet handling operations.

In Patent Literature 2, there is disclosed a relaying device including a port movement circuit for detecting port movements that will take place in case a frame has arrived via a path other than a learned path in a MAC address table.

[Patent Literature 1]
WO2008/095010A1 Pamphlet
[Patent Literature 2]
JP Patent Kokai Publication No. JP2008-301003A
[Non-Patent Literature 1]
Nick McKeown et al., "OpenFlow: Enabling Innovation in Campus Networks", (online), (retrieved on Jul. 6, 2010), Internet <URL: http://www.openflowswitch.org/documents/openflow-wp-latest.pdf>
[Non-Patent Literature 2]
"OpenFlow Switch Specification" Version 1.0.0. (Wire Protocol 0x01) (retrieved on Jul. 6, 2010), Internet <URL: http://www.openflowswitch.org/documents/openflow-spec-v1.0.0.pdf>

SUMMARY

The entire disclosures of the above mentioned Patent Literatures and Non-Patent Literatures are incorporated herein by reference thereto.

The following analysis is given by the present invention. As also stated in Patent Literature 2, in a Layer-2 switch, where an incoming packet is learned by a MAC address table, mistaken learning of the MAC address table may occur as a result of reception of a packet from a non-intended direction.

Thus, in an environment in which both OpenFlow switches as disclosed in Patent Literature 1 and in Non-Patent Literatures 1 and 2 and the Layer-2 switches are connected together, there is raised a problem that, due to the Layer-2 switches, present on the forwarding path, packets may not flow in accordance with a forwarding path as set by the OpenFlow controller.

Figure 10:
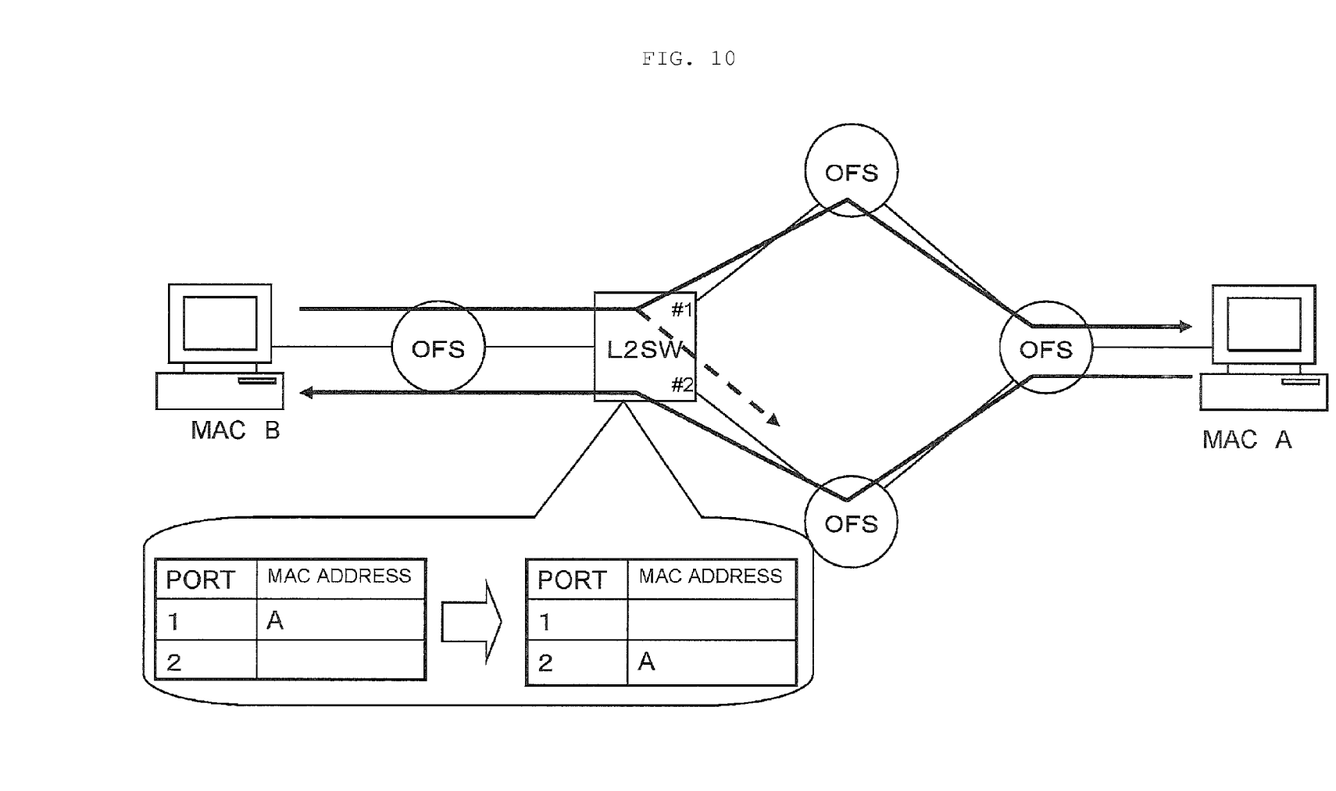
FIG. 10 is a schematic view for illustrating a case of mistaken learning of a MAC address table.

For example, if the OpenFlow controller has set different forwarding paths for the on-going and return paths, a MAC address table of the Layer-2 switch (L2SW) is updated as indicated by encircled mini-tables in a lower part of FIG. 10. It is because a packet addressed from a terminal MAC A to a terminal MAC B of FIG. 10 is received by a port 2 of the Layer-2 switch (L2SW) provided halfway. Thus, a packet subsequently transmitted from the terminal MAC B to the terminal MAC A is output at the port 2 of the Layer-2 switch (L2SW), as indicated by a broken line in FIG. 10.

It is an object thereof to provide a configuration and a method wherein a packet is able to be forwarded in accordance with an intended path even in an environment where there co-exist both the node represented by the above mentioned Layer-2 switch and the node represented by the Open-Flow switch as disclosed in Patent Literature 1 and in the Non-Patent Literatures 1 and 2.

In a first aspect, there is provided a communication system which includes a first node that holds, for a preset time, a set of entries that correlate ports of the first node with address information of a plurality of nodes to which a packet received by the first node is able to be forwarded via the ports, based upon address of a transmission source of the packet received. The first node references the set of entries to decide on a port correlated with a destination of the packet to forward the packet. The communication system also includes a plurality of second nodes each including a packet processor. The packet processor processes an incoming packet in accordance with a set of packet handling operations that correlate a processing to be applied to the packet with a matching rule adapted to identify a packet to be subjected to the processing.

The communication system further includes a controller that causes a destination learning packet to be transmitted from the second node lying on the downstream side of the first node on the packet forwarding path towards the first node so as to be received by the first node. The destination learning packet has one of the second nodes on the downstream side of the first node on a preset packet forwarding path as a source of transmission. The first node is thus caused to perform a packet forwarding operation in accordance with the packet forwarding path.

In a second aspect, there is provided a controller which is connected to a first node that holds, for a preset time, a set of entries that correlate ports of the first node with address infoimation of a plurality of nodes to which a packet received by the first node is able to be forwarded via the ports, based upon an address of a transmission source of the packet received. The first node references the set of entries to decide on the port correlated with the destination of the packet to forward the packet. The controller is also connected to a plurality of second nodes. Each of the second nodes includes a packet processor that processes the incoming packet in accordance with a set of packet handling operations that correlates a processing applied to the packet with a matching rule adapted to identify the packet to be subjected to the processing. The controller causes a destination learning packet to be transmitted from the second node lying on the downstream side of the first node on the packet forwarding path towards the first node so as to be received by the first node. The destination learning packet has one of the second nodes on the downstream side of the first node on a preset packet forwarding path as a source of transmission. The first node is thus caused to perform a packet forwarding operation in accordance with the packet forwarding path.

In a third aspect, there is provided a node controlling method in which a controller is connected to a first node that holds, for a preset time, a set of entries that correlate ports of the first node with the address information of a plurality of nodes to which a packet received by the first node is able to be forwarded via the ports, based upon an address of a transmission source of the packet received; the first node referencing the set of entries to decide on the ports correlated with the destination of the packet to forward the packet; and to a plurality of second nodes; each of the second nodes including a packet processor that processes the incoming packet in accordance with a set of packet handling operations that correlate a processing applied to the packet with a matching rule adapted to identify the packet to be subjected to the processing. The controller causes a destination learning packet to be transmitted from the second node lying on the downstream side of the first node on the packet forwarding path towards the first node so as to be received by the first node; the destination learning packet having one of the second nodes on a downstream side of the first node on a preset packet forwarding path as a source of transmission. The controller causes the first node to update an entry that correlates ports of the first node with the address information of nodes to which a packet is able to be forwarded via the ports based upon the transmission source address of the destination learning packet. It is noted that the present method is bound up with a specified machine, viz., a computer composing a controller that controls the above mentioned second node.

In a fourth aspect, there is provided a program to be run on a computer composing a controller. The controller is connected to a first node that holds, for a preset time, a set of entries that correlate ports of the first node with address information of a plurality of nodes to which a packet received by the first node is able to be forwarded via the ports, based upon address of a transmission source of the packet received; the first node referencing the set of entries to decide on a port correlated with a destination of the packet to forward the packet; and to a plurality of second nodes; each of the second nodes including a packet processor that processes an incoming packet in accordance with a set of packet handling operations that correlates a processing to be applied to the packet with a matching rule adapted to identify the packet to be subjected to the processing. The program causes the computer to execute a processing of transmitting a destination learning packet to a second node lying on the downstream side of the first node on a data packet forwarding path to forward the destination learning packet to the first node, or a processing of instructing the second node lying on the downstream side of the first node to generate a destination learning packet and to send the destination learning packet to the first node, whereby the first node is caused to receive the destination learning packet. It is noted that the present program may be recorded on a computer-readable recording medium Viz., the present invention may be implemented as a computer program product.

The meritorious effects of the present invention are summarized as follows.

It is possible to forward a packet in accordance with an intended path even under an environment where there co-exist a node represented by the above mentioned Layer-2 switch (L2SW) and a node represented by the OpenFlow switch disclosed in Patent Literature 1 and in Non-Patent Literatures 1 and 2.

PREFERRED MODES

Figure 1:
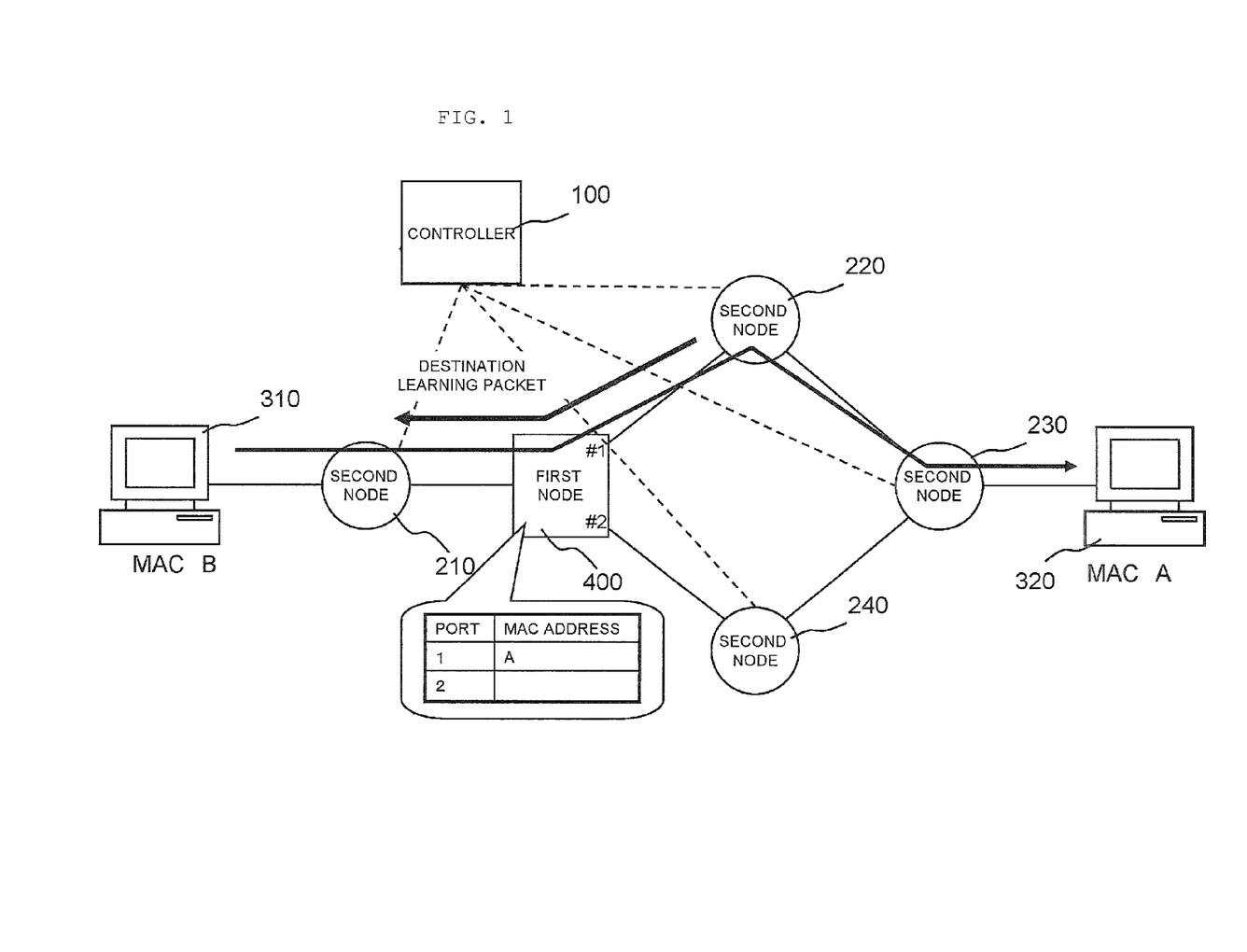
FIG. 1 is a schematic view for illustrating schemata of the present invention.

Initially, the outline of the disclosure will be explained. Referring to FIG. 1, an exemplary embodiment of the present disclosure may be implemented by a first network node 400, a set of second network nodes 210, 220, 230 and 240 and a controller 100. The first network node holds a set of entries that, based upon an address of a source of transmission of an incoming packet, correlates the node's own ports with the address information of nodes to which the packet is able to be forwarded via the ports. The first node references the set of the entries to decide on a port correlated with a destination of the packet to forward the packet. Each of the second network nodes 210, 220, 230 and 240 includes a packet processor that processes an incoming packet in accordance with a set of packet handling operations which correlate a processing to be applied to the packet with a matching rule adapted to identify the packet to be subjected to the processing. The controller 100 allows a destination learning packet to be received by the first node 400 via a second node, such as the second node 220 of FIG. 1. It is noted that reference numerals used above are affixed to relevant elements only for facility in understanding and are not intended to restrict the invention to the mode(s) shown in the drawings.

For example, it is assumed that, for a packet transmitted from a terminal 310 to a terminal 320 of FIG. 1, such a forwarding path has been decided in which the packet is forwarded via the second node 210, first node 400, second node 220 and the second node 230 in this order. It is noted that, if the packet having a MAC address of the terminal 320 (MAC A) should flow from the terminal 320 to a port #2 of the first node 400, the first node 400 would have learned through error that the packet having MAC A as destination should be output via the port #2 (see FIG. 10). On the other hand, if the first node 400 has not received the packet having the MAC A as destination for longer than a preset time, the first node would delete the MAC address (MAC A) of the terminal 320 from the entries bound up (correlated) with the port #1.

In this consideration, the controller 100 of the present invention transmits a destination learning packet to the first node 400, provided on the above mentioned packet forwarding path, at a preset time interval. The destination learning packet has the MAC address MAC A of the terminal 320 as an address of a transmission source. This updates packet forwarding entries, held at the first node, thus more reliably allowing carrying out a packet forwarding operation appropriate for the above mentioned packet forwarding path. It is noted that the destination learning packet is desirably transmitted at such a short interval as not to wipe out necessary entries in consideration of entry holding time of the first node 400 (time-out value).

Exemplary Embodiment 1

Figure 2:
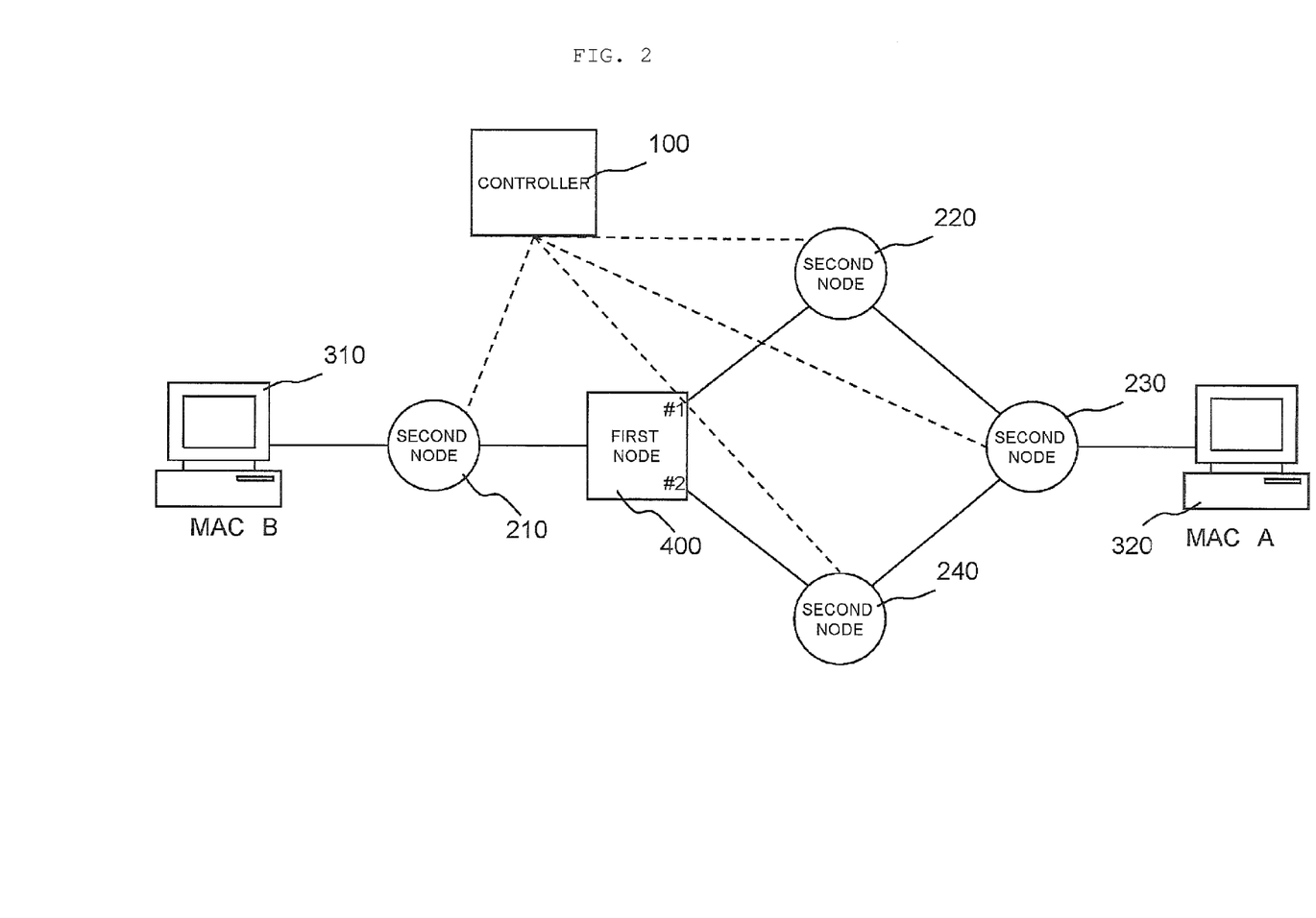
FIG. 2 is a schematic view showing the configuration of an exemplary embodiment 1 of the present invention.

An exemplary embodiment 1 of the present invention will now be described with reference to the drawings. FIG. 2 shows a configuration of the exemplary embodiment 1 of the present invention. Referring to FIG. 2, the configuration of the exemplary embodiment 1 includes a second node 210, the terminal 310 is connected to, a second node 230, the terminal 320 is connected to, and the first node 400 that forwards the packet to the second node 220 or to the second node 240 by referencing a destination address of the packet transmitted from the second node 210. In addition, the configuration of the exemplary embodiment 1 includes the second nodes 220, 240 interconnecting the second node 230 and the first node 400.

The first node 400 is a Layer-2 switch that holds, for a preset time, a set of entries that correlate one of its own ports, based upon an address of the source of transmission of a packet received, with the address information of a node to which the incoming packet is able to be forwarded via the port in question. These entries are equivalent to the entries of a MAC address table held by a switching hub, for example. It is assumed that, in the following exemplary embodiment, the second node 220 and the second node 240 are connected to the ports #1 and #2 of the first node 400, respectively.

Each of the second nodes 210 to 240 is a switch including a packet processor that processes the incoming packet in accordance with a set of packet handling operations that correlate a processing to be applied to the packet with a matching rule adapted to identify the packet to be subjected to the processing. For example, a switch that may operate as the OpenFlow switch of Non-Patent Literature 2 may be used as the second node.

The controller 100 has the function of allowing an arbitrary one of the second nodes 210, 220, 230 and 240 to transmit, viz., send out, a destination learning packet. In the following description of the exemplary embodiments, it is assumed that the controller 100 is an OpenFlow controller of Non-Patent Literature 2 capable of setting the packet handling operations (flow entries) for the second nodes 210 to 240, sending out a packet(s) buffered or collecting the statistic information (Counters). The controller 100 may also be an independent device capable of operating in cooperation with the Open-Flow controller of Non-Patent Literature 2, viz., transmitting a destination learning packet in order to implement a packet forwarding path prepared by the OpenFlow controller.

In the exemplary embodiments that follow, it is explained that the MAC address of the terminal 310 is 'B' and that of the terminal 320 is 'A'.

Figure 3:
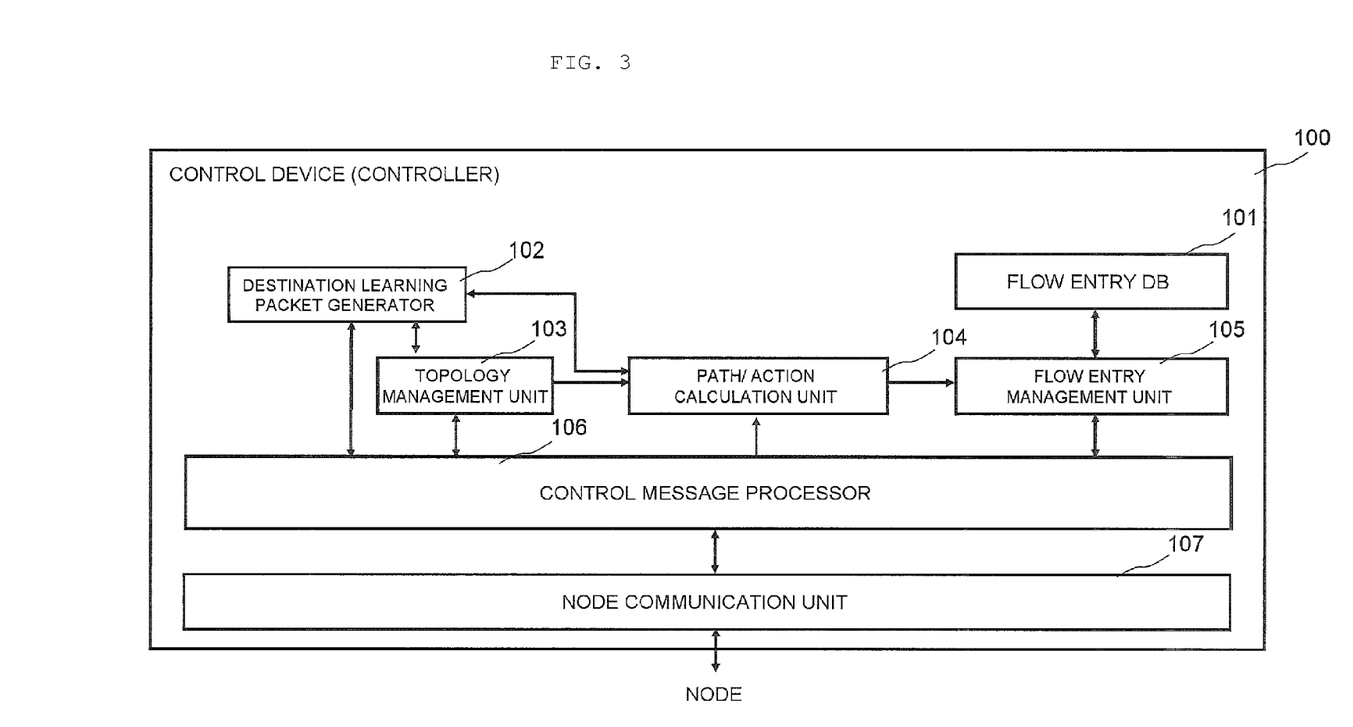
FIG. 3 is a block diagram showing the detailed configuration of a control device (controller) of the exemplary embodiment 1 of the present invention.

FIG. 3 depicts a block diagram showing the configuration of a control device (controller) 100 operating as Open-Flow controller and also capable of transmitting a destination learning packet. Referring to FIG. 3, the control device (controller) 100 includes a flow entry database (flow entry DB) 101 in which there is store the packet handling operations (flow entries) each made up of a matching rule, shown by way of example in FIG. 9, an action, inclusive of a timer value, and the flow statistic information. The controller 100 also includes a destination learning packet generator 102, a topology management unit 103, a path/action calculation unit 104, a flow entry management unit 105, a control message processor 106 and a node communication unit 107 for performing communication with the nodes 210 to 240. The operation of these components is the following.

Triggered with a preparation of a new flow by the path/action calculation unit 104 or the like, the destination learning packet generator 102 references the network topological information, constructed by the topology management unit 103, to decide on the second node which is to operate as a start point of a section via which a destination learning packet is caused to flow. Such second node is to be provided on a downstream side on the packet forwarding path of the first node 400 which is to conduct the learning. The destination learning packet generator also generates a destination learning packet to be sent out to part or all of packet forwarding paths that include the above mentioned first node 400. In more concrete terms, the destination learning packet generator generates a packet having a destination MAC address of a data packet flowing on the packet forwarding path as a MAC address of the source of transmission, and having, as a destination MAC address, a MAC address of the second node at a terminal end of the domain via which the destination learning packet is caused to flow.

It is noted that the completion of the learning with the above mentioned destination learning packet may be detected by a request for addition or update (Packet-In) of the set of packet handling operations (flow entries) from the second node at the terminal end of the path section via which the destination learning packet has been caused to flow.

The topology management unit 103 constructs (creates) and manages the network topological information based upon the relationship of interconnection of the nodes 210 to 240 as collected via the node communication unit 107.

The path/action calculation unit 104 finds, based upon the network topological information, as constructed by the topology management unit 103, a packet forwarding path, an action(s) to be carried out by each of the nodes 210 to 240 lying on the forwarding path and timer values that are to be time period of validity for the packet handling operations.

The flow entry management unit 105 formulates a matching rule (matching key) based upon the information received from the node. The flow entry management unit also registers the results calculated by the path/action calculation unit 104 as a set of packet handling operations (flow entries) in the flow entry DB 101, while setting the set of packet handling operations (flow entries) in response to a request for addition or update of the set of packet handling operations (flow entries) from each of the nodes 210 to 240.

The control message processor 106 analyzes a control message, received from the nodes 210 to 240, to deliver the control message information to relevant processing means within the control device (controller) 100. For example, on receipt from the nodes 210 to 240 of a message notifying the detection of a new flow (Packet-In), the control message processor 106 checks to see whether or not the set of packet handling operations (flow entries) to be applied to such new flow has been registered in the flow entry DB 101. If the set of packet handling operations has not been registered, the control message processor asks the path/action calculation unit 104 to formulate a new a set of packet handling operations (flow entries).

The control message processor 106 also sends a destination learning packet, generated in the destination learning packet generator 102, to the second node as a start point of the path section via which the destination learning packet is caused to flow to the first node 400, and the control message processor requests the second node to transmit the packet via a specified port. In case it is necessary to allow each of a plurality of first nodes 400 to receive the destination learning packet, the control message processor also sets the packet handling operation(s) (flow entries) that implement the forwarding paths of interest in the second node(s) lying on the destination learning packet forwarding path(s) including the first node(s) as well.

A computer program that allows the respective components (processing means) of the controller 100, shown in FIG. 3, to execute the above mentioned processing operations with the aid of the hardware of a computer composing the controller 100, may also be used.

In the present exemplary embodiment, it has been explained that the controller 100 prepares the destination learning packet and requests the second node to transmit the so prepared packet. It is however also possible for the controller to request the second node to generate and transmit the destination learning packet. It is then possible for the controller to instruct the second node to rewrite a header of a packet held by a buffer etc., to output the resulting packet at a specified port, or to set a set of packet handling operation(s) (flow entry) that has defined an action for carrying out the rewrite/outputting operation. By so doing, an equivalent operation may be accomplished.

An entry for packet forwarding of the relevant first node 400 may be kept in an optimum condition by causing a destination learning packet to flow through the path section including the first node 400, as described above.

Exemplary Embodiment 2

Figure 4:
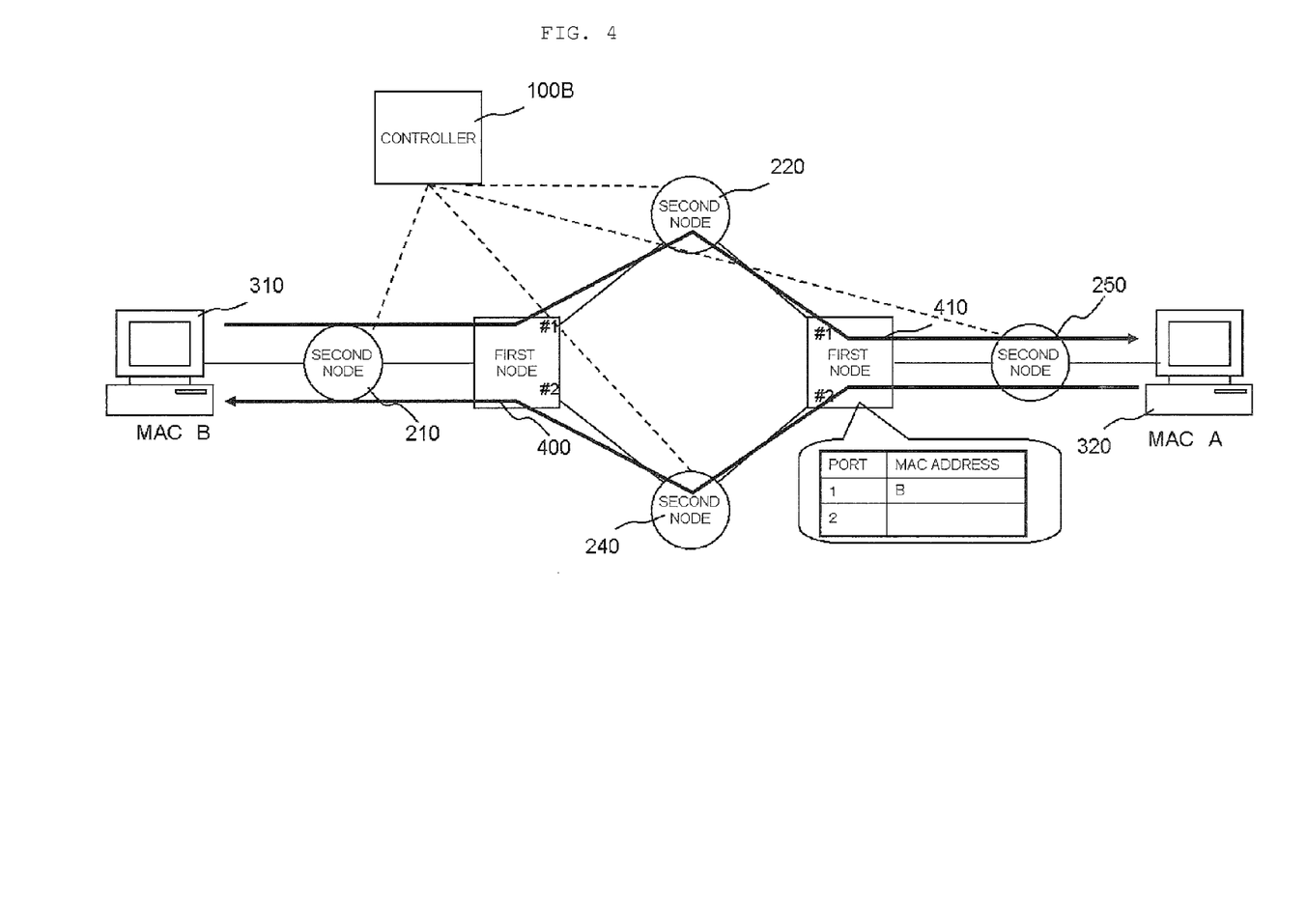
FIG. 4 is a schematic view for illustrating a packet forwarding path to be implemented by an exemplary embodiment 2 of the present invention.

An exemplary embodiment 2 of the present invention will now be described with reference to the drawings. In the above described exemplary embodiment 1, a certain specified packet forwarding path is maintained. In the present exemplary embodiment 2, packets are forwarded via two first nodes, arranged opposing to each other, as shown in FIG. 4, so that packets differing from each other will be forwarded on a on-going path and on a return path via different packet forwarding paths. Since the present exemplary embodiment 2 may be implemented by a configuration equivalent to that of the exemplary embodiment 1, described above, the following explanation will be centered on the points of difference from the exemplary embodiment 1.

It is assumed that, in a network in which there is added a first node 410 equivalent to the first node 400, packets differing from each other are forwarded on the on-going path and on the return path via different packet forwarding paths, as shown in FIG. 4. In such case, at a time point the packet addressed to the terminal 320 (MAC address=A) from the terminal 310 (with the MAC address=B) of FIG. 4, has been received by the first node 410 on the right side of the figure, the first node 410 would learn that the packet whose destination MAC address is B is to be forwarded via its port #1.

Thus, with the destination learning packet of the exemplary embodiment 1, it becomes impossible to implement packet forwarding paths that differ for the on-going path and for the return path.

Figure 5:
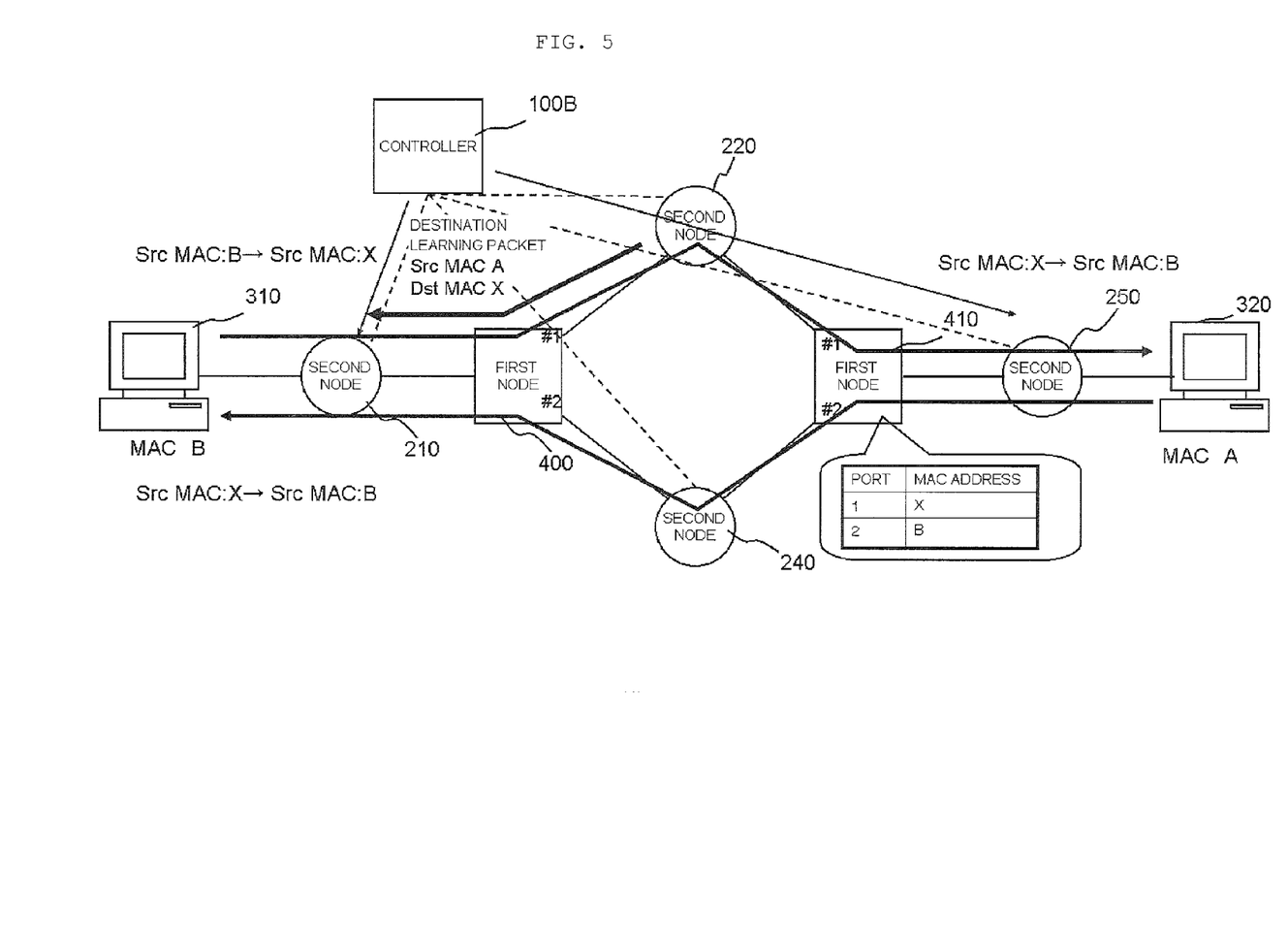
FIG. 5 is a schematic view for illustrating the operation of the exemplary embodiment 2 of the present invention.

Thus, in setting the set of packet handling operation(s) (flow entry) for the second node 210 as a start point of the data packet forwarding path, a control device (controller) 100B of the present exemplary embodiment adds an action of rewriting the MAC address of the transmission source in a packet header of a data packet to a preset MAC address, such as 'X', as shown in FIG. 5. Similarly, a set of packet handling operations (flow entry), added to with an action of rewriting the transmission source MAC address, is set in a second node 250 as a start point of the data packet forwarding path from the terminal 320 to the terminal 310, although such is not shown in FIG. 5.

The control device (controller) 100B of the present exemplary embodiment then allows the second node 220 or the second node 250 to transmit a destination learning packet in which the above mentioned preset MAC address (X) is the destination MAC address and the transmission source MAC address is the MAC address (A) of the terminal 320. The first node 400 thus learns sending via the port #1 a packet that has the terminal 320 as destination. Further, by allowing the first node 410 to receive a destination learning packet in similar manner, the first node 410 may be made to learn sending the packet, having the MAC address (B) as destination, via its port #2, even though this is not shown in FIG. 5.

Even though the above mentioned data packet or the destination learning packet from the second node 250 is received by the first node 410, the node 410 only learns sending via the port #1 the packet whose destination MAC address is the MAC address (X). The first node 410 thus maintains the entry of sending the packet, whose destination MAC address is the MAC address (B), via its port #2. It is thus possible to achieve a packet forwarding path for the on-going path that differs from a packet forwarding path for the return path, as shown in FIG. 5. In similar manner, the first node 400 maintains the entry of sending the packet, having the MAC address (A) as the destination MAC address, via its port #1.

As described above, it becomes possible with the present exemplary embodiment to achieve a packet forwarding path for the on-going path differing from one for the return path. It is noted that, as a matter of course, if the rewritten MAC address is contained in the matching rule (matching key) of the set of packet handling operations (flow entries) to be set in each of the second nodes 220, 240, it is necessary to correct contents related with the rewritten MAC address.

Exemplary Embodiment 3

An exemplary embodiment 3 of the present invention will now be described. In the above described exemplary embodiment 1, a certain specified packet forwarding path is to be maintained. In the present exemplary embodiment, a packet 1 of the same destination is forwarded as it is branched on the flow-by-flow basis, as indicated by a thick broken line in FIG. 6. Since the present exemplary embodiment 3 may be implemented by the configuration equivalent to that of the exemplary embodiment 1, described above, the following explanation will be centered on the points of difference of the present exemplary embodiment from the exemplary embodiment 1.

Figure 6:
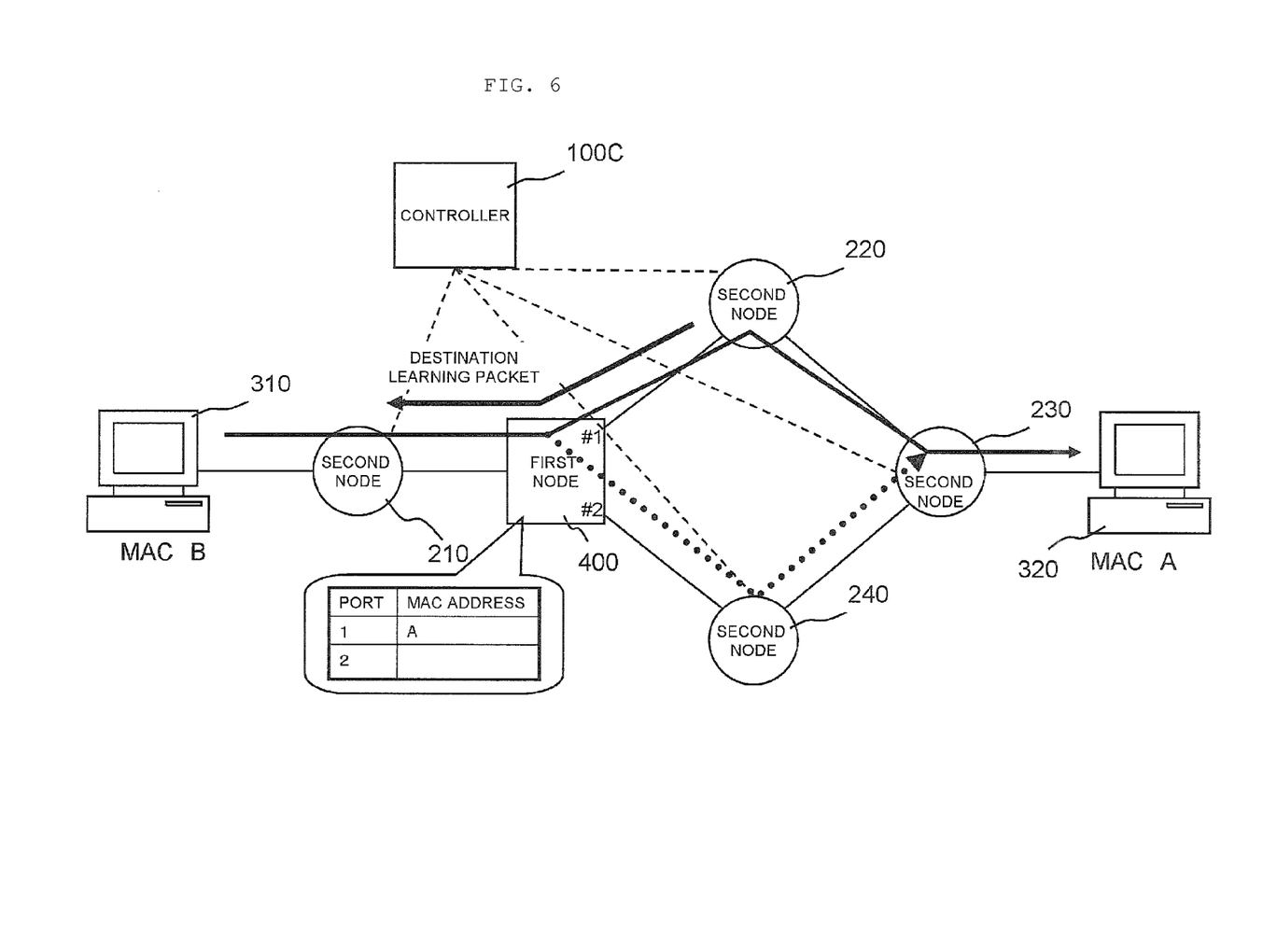
FIG. 6 is a schematic view for illustrating a packet forwarding path to be implemented by an exemplary embodiment 3 of the present invention.

Referring to FIG. 6, with the destination learning packet, which is equivalent to that used in the exemplary embodiment 1, learning is made in such a manner that packets at the first node 400, having the MAC address (A) as the destination, are all sent via its port #1. It is thus not possible for the first node 400 to forward the packet as it is branched at the node 400 on the flow-by-flow basis.

Figure 7:
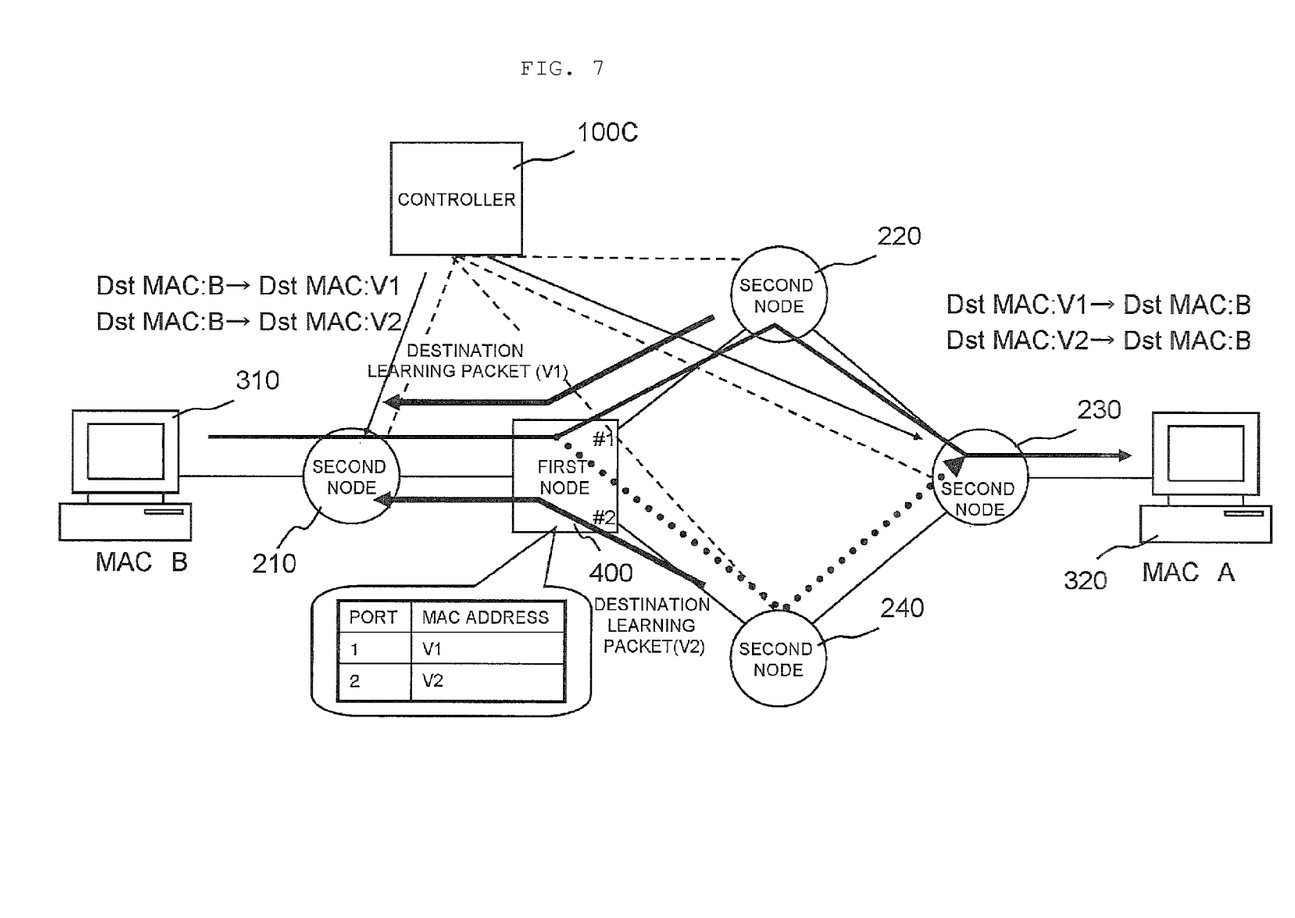
FIG. 7 is a schematic view for illustrating the operation of the exemplary embodiment 3 of the present invention.

Thus, in setting the set of packet handling operations (flow entries) at the second node 210 as a start point of a data packet forwarding path, a control device (controller) 100C of the present exemplary embodiment adds an action of rewriting the destination MAC address in a packet header of the data packet to MAC addresses that are unique from flow to flow, such as 'V1' or 'V2', as shown in FIG. 7. Further, in setting the set of packet handling operations (flow entries) in the second node 230 as an end point of the data packet forwarding path, the control device (controller) 100C adds an action of rewriting the destination MAC address in the packet header of the data packet from the MAC addresses that are unique from flow to flow, such as 'V1' or 'V2' to the original MAC address.

It is noted that the MAC addresses that are unique from flow to flow may be generated by the destination learning packet generator 102 of the controller 100, or entry management numbers etc., used in the flow entry DB 101 may be so used.

Subsequently, the controller 100C of the present exemplary embodiment allows the second node 220 or a second node 250 to send a destination learning packet having a MAC address V1, unique from flow to flow, as the transmission source MAC address. The controller 100 also allows the second node 240 or the second node 250 to transmit a destination learning packet having a MAC address (V2) unique from flow to flow as the transmission source MC address. The first node 400 thus learns transmitting at its port #1 a packet having the MAC address (V1) as destination as well as transmitting at its port #2 a packet having the MAC address (V2) as destination.

With the present exemplary embodiment, it is thus possible to allow the first node 400 on the packet forwarding path to perform a flow-based packet forwarding operation like the operation performed by the second node. As a matter of course, if the rewritten MAC address is contained in the matching rule (matching key) of the set of packet handling operations (flow entries) to be set in the second node 220 or in the second node 240, it is necessary to correct contents related with the rewritten MAC address.

Exemplary Embodiment 4

An exemplary embodiment 4 of the present invention will now be described with reference to the drawings. In the exemplary embodiment 3, described above, the MAC addresses, unique from flow to flow, are learned. There is thus a fear that the number of entries held by the first node might be increased. In the present exemplary embodiment, the unique MAC addresses are accorded to respective ports of each of the second nodes on the packet forwarding path to suppress the number of entries held by the first node from increasing. Since the present exemplary embodiment 4 may be implemented by the configuration equivalent to that of the exemplary embodiment 1, described above, the following explanation will be centered on the points of difference of the present exemplary embodiment from the exemplary embodiment 1.

Figure 8:
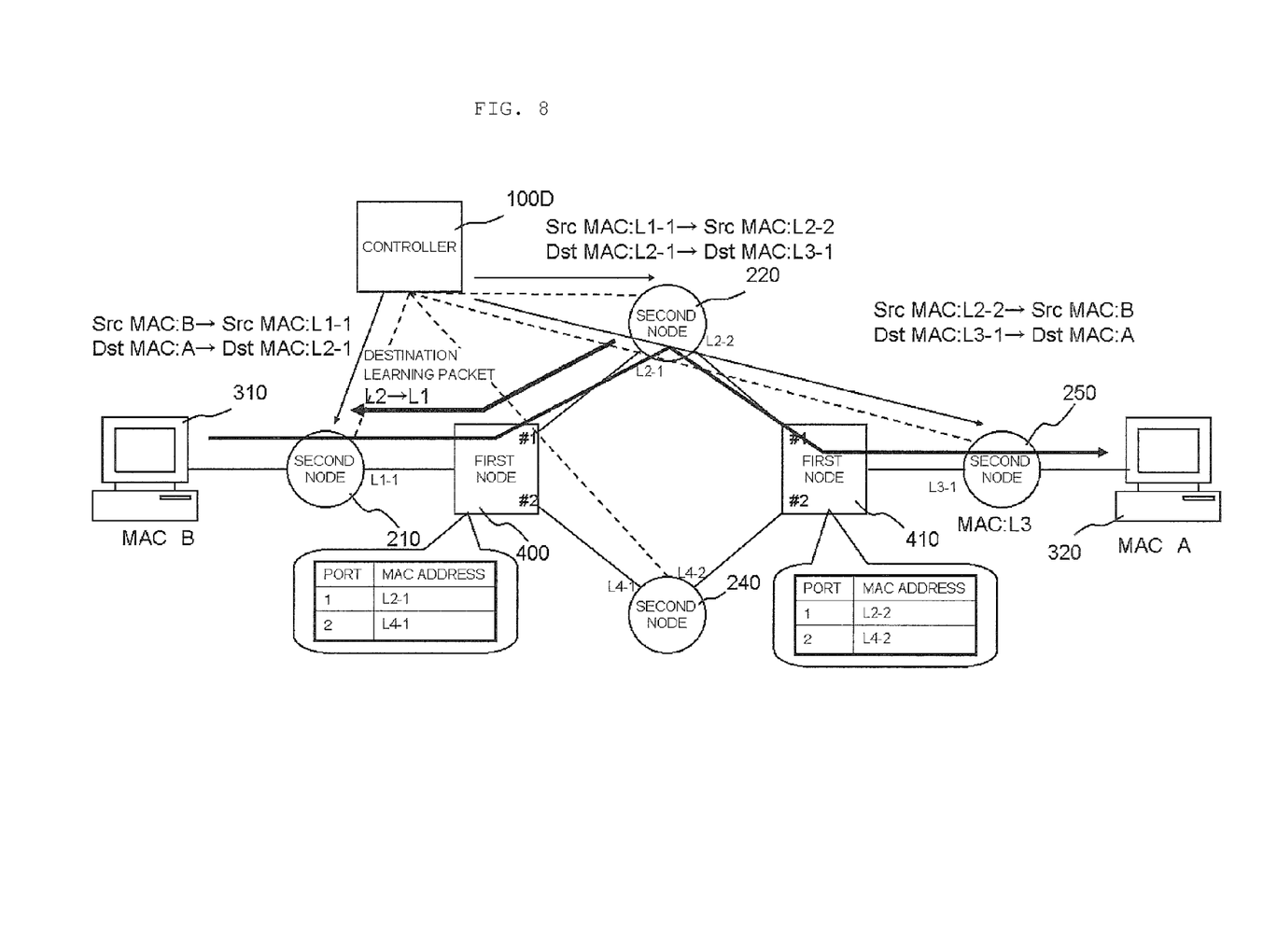
FIG. 8 is a schematic view for illustrating the operation of the exemplary embodiment 4 of the present invention.

In the explanation to follow, the MAC address of a connection port of a second node 210 to a first node 400 is labeled L1-1, and the MAC address of a connection port of the second node 220 to the first node 400 is labeled L2-1. The MAC address of the connection port of the second node 220 to a first node 410 is labeled L2-2. Similarly, the MAC address of a connection port of a second node 240 to the first node 400 is labeled L4-1, and the MAC address of a connection port of the second node 240 to the first node 410 is labeled L4-2. The MAC address of a connection port of a second node 250 to the first node 410 is labeled L3-1.

In setting the packet handling operations (flow entries) in the second nodes 210, 220 on the data packet forwarding path, a controller 100D of the present exemplary embodiment adds an action of rewriting the destination and the transmission source MAC addresses in a packet header of a data packet to the MAC addresses of the own (second) nodes 210, 220 and to the MAC addresses of the next hop, as shown in FIG. 8. Also, in setting the set of packet handling operations (flow entries) in the second node 250 as a terminal point of the data packet forwarding path, the controller 100 adds an action of restoring the destination and the transmission source MAC addresses in the packet header of the data packet to the original MAC address.

The controller 100D of the present exemplary embodiment then allows transmitting a destination learning packet in which the destination MAC address and the transmission source MAC address of the data packet are interchanged. For such destination learning packet, an LLDP (Link Layer Discovery Protocol) packet may be used to advantage.

By so doing, the first nodes 400, 410 learn only the MAC address of each of the second nodes, directly connected thereto, so that it is possible to suppress the number of entries held by the first nodes 400, 410.

Also, in the present exemplary embodiment, the packet header of the data packet is rewritten from hop to hop, and learning is made by a destination learning packet corresponding to the rewritten packet header. It is thus possible to implement a packet forwarding path for the on-going path different from that for the return path. Moreover, a packet for the same destination may be branched into a plurality of flow-based packets by rewriting the data packet to flow-based MAC addresses instead of to the port-based MAC addresses of each of the second nodes and by sending the flow-based destination learning packets as in the exemplary embodiment 3.

Although the description has been made of preferred exemplary embodiments of the present invention, such exemplary embodiments are given only by way of illustration and are not intended to limit the scope of the invention. Viz., further modifications, substitutions or adjustments may be made without departing from the basic technical concept of the present invention. For example, the numbers of each of the first and second nodes or the network configurations, shown in the above exemplary embodiments, are only for assisting in understanding the present invention and may broadly be varied.

The present invention may comprise following nodes of preferred Examples of Execution:

<First Mode>
(See the above mentioned communication system according to the first aspect)

<Second Mode>
The communication system of the first mode, wherein said controller transmits a destination learning packet to a second node, lying on the downstream side of said first node on a forwarding path of a data packet, to cause said destination learning packet to be forwarded to said first node, or instructs the second node, lying on the downstream side of said first node, to generate said destination learning packet and to transmit the so generated destination learning packet to said first node, whereby said first node is caused to receive said destination learning packet.

<Third Mode>
The communication system of the first or second mode, wherein, in setting a set of packet handling operations in a second node, lying on the downstream side of said first node on said preset packet forwarding path, said controller adds to said set of packet handling operations a processing of rewriting a transmission source address to another address.

<Fourth Mode>
The communication system of any one of the first to third modes, wherein, in setting a set of packet handling operations in a second node, lying on the upstream side of said first node on said preset packet forwarding path, said controller adds to said set of packet handling operations a processing of rewriting a destination address of a packet header to an imaginary destination address set on the flow-by-flow basis; and wherein said controller causes said first node to receive, as said destination learning packet, a packet having said imaginary destination address as a source of transmission and having a node lying on the upstream side of said first node as destination.

<Fifth Mode>
The communication system of any one of the first to fourth modes, wherein, in setting a set of packet handling operations in a second node connected to said first node on a preset packet forwarding path including the first node, said controller adds to the set of packet handling operations for said second node connected via said first node a processing of rewriting a packet header so that an imaginary address set in a port of the second node will be a source of transmission and an imaginary address set in a port of the second node connected via said first node will be a destination; and wherein said first node is caused to receive, as said destination learning packet, a direction-reversed destination learning packet having each imaginary address as a source of transmission and destination.

<Sixth Mode>
The communication system according to the fifth mode, wherein an LLDP (Link Layer Discovery Protocol) packet is used as said destination learning packet.

<Seventh Mode>
The communication system according to any one of the first to sixth modes, wherein said controller causes said first node to receive a destination learning packet at a time interval shorter than an entry holding time interval of said first node.

<Eighth Mode>
(See control device according to the above mentioned second aspect)

<Ninth Mode>
(See node controlling method according to the above mentioned third aspect)

<Tenth Mode>
(See program according to the above mentioned fourth aspect)

Similarly to the communication system of the above mentioned first mode, the above mentioned eighth to tenth modes may be extended as indicated in the second to seventh modes. The disclosures of the aforementioned Patent Literature and the Non-Patent Literatures are herein incorporated by reference thereto. The particular exemplary embodiments or examples may be modified or adjusted within the gamut of the entire disclosure of the present invention, inclusive of claims, based on the fundamental technical concept of the invention. Further, a variety of combinations or selection of elements disclosed herein may be made within the framework of the claims.

REFERENCE SIGNS LIST 100, 100B, 100C, 100D control devices (controllers)
400, 410 first nodes
210, 220, 230, 240, 250 second nodes
310, 320 terminals
101 flow entry database (flow entry DB)
102 destination learning packet generator
103 topology management unit
104 path/action calculation unit
105 flow entry management unit
106 control message processor
107 node communication unit

What is claimed is:

1. A communication system, comprising:
a first node that holds, for a preset time, a set of entries that correlate ports of said first node with address information of a plurality of nodes to which a packet received by said first node is able to be forwarded via said ports, based upon address of a transmission source of said packet received; said first node referencing said set of entries to decide on a port correlated with a destination of said packet to forward said packet;
a plurality of second nodes; each of said second nodes including a packet processor that processes an incoming packet in accordance with a set of packet handling operations that correlate a processing to be applied to said packet with a matching rule adapted to identify a packet to be a subjected to said processing; and
a controller that causes a destination learning packet to be transmitted from the second node lying on the downstream side of said first node on a preset packet forwarding path towards said first node so as to be received by said first node; said destination learning packet having one of the second nodes on the downstream side of said first node on said preset packet forwarding path as a source of transmission; whereby said first node is caused to perform a packet forwarding operation in accordance with said packet forwarding path wherein,
in setting the set of packet handling operations in said second node lying on the upstream side of said first node on said preset packet forwarding path, said controller adds to said set of packet handling operations a processing of rewriting a destination address of a packet header to an imaginary destination address which is set from one flow to another;
said first node being caused to receive, as said destination learning packet, a packet having said imaginary destination address as a transmission source and having said node lying on the upstream side of said first node as destination.

2. The communication system according to claim 1, wherein said controller sends the destination learning packet to the second node lying on the downstream side of said first node on a forwarding path of a data packet to cause to forward said destination learning packet to said first node, or commands said second node lying on the downstream side of said first node to generate said destination learning packet and send said destination learning packet generated to said first node, whereby said first node is caused to receive said destination learning packet.

3. The communication system according to claim 1, wherein, in setting the set of packet handling operations in said second node lying on the upstream side of said first node on said preset packet forwarding path, said controller adds to said set of packet handling operations a processing of rewriting a transmission source address to another address.

4. A communication system, comprising:
a first node that holds, for a preset time, a set of entries that correlate ports of said first node with address information of a plurality of nodes to which a packet received by said first node is able to be forwarded via said ports, based upon address of a transmission source of said packet received; said first node referencing said set of entries to decide on a port correlated with a destination of said packet to forward said packet;
a plurality of second nodes; each of said second nodes including a packet processor that processes an incoming packet in accordance with a set of packet handling operations that correlate a processing to be applied to said packet with a matching rule adapted to identify a packet to be a subjected to said processing; and
a controller that causes a destination learning packet to be transmitted from the second node lying on the downstream side of said first node on a preset packet forwarding path towards said first node so as to be received by said first node; said destination learning packet having one of the second nodes on the downstream side of said first node on said preset packet forwarding path as a source of transmission; whereby said first node is caused to perform a packet forwarding operation in accordance with said packet forwarding path,
wherein, in setting the set of packet handling operations in a second node connected to the first node on said packet forwarding path including said first node, said controller adds to the set of packet handling operations of said second node connected via said first node a processing of rewriting a packet header so that an imaginary address set in a port of the second node will be a transmission source and an imaginary address set in a port of said second node connected via said first node will be a destination, and
said first node being caused to receive a direction-reversed destination learning packet having said imaginary destination addresses set in the port of said second node connected via said first node as the transmission source and having said imaginary destination address set in the second node connected to the first node as the destination.

5. The communication system according to claim 4, wherein an LLDP (Link Layer Discovery Protocol) packet is used as said destination learning packet.

6. The communication system according to claim 1, wherein said controller causes said first node to receive the destination learning packet at a time interval shorter than an entry holding time interval of said first node.

7. The communication system according to claim 2, wherein,
in setting the set of packet handling operations in said second node lying on the upstream side of said first node on said preset packet forwarding path, said controller adds to said set of packet handling operations a processing of rewriting a transmission source address to another address.

8. The communication system according to claim 4, wherein
said controller sends the destination learning packet to the second node lying on the downstream side of said first node on a forwarding path of a data packet to cause to forward said destination learning packet to said first node, or commands said second node lying on the downstream side of said first node to generate said destination learning packet and send said destination learning packet generated to said first node, whereby said first node is caused to receive said destination learning packet.

9. The communication system according to claim 4, wherein,
in setting the set of packet handling operations in said second node lying on the upstream side of said first node on said preset packet forwarding path, said controller adds to said set of packet handling operations a processing of rewriting a transmission source address to another address.

10. The communication system according to claim 4, wherein,
in setting the set of packet handling operations in said second node lying on the upstream side of said first node on said preset packet forwarding path, said controller adds to said set of packet handling operations a processing of rewriting a destination address of a packet header to an imaginary destination address which is set from one flow to another;
said first node being caused to receive, as said destination learning packet, a packet having said imaginary destination address as a transmission source and having said node lying on the upstream side of said first node as destination.

11. A communication system, comprising:
a first node that holds, for a preset time, a set of entries that correlate ports of said first node with address information of a plurality of nodes to which a packet received by said first node is able to be forwarded via said ports, based upon address of a transmission source of said packet received; said first node referencing said set of entries to decide on a port correlated with a destination of said packet to forward said packet;
a plurality of second nodes; each of said second nodes including a packet processor that processes an incoming packet in accordance with a set of packet handling operations that correlate a processing to be applied to said packet with a matching rule adapted to identify a packet to be a subjected to said processing; and
a controller that causes a destination learning packet to be transmitted from the second node lying on the downstream side of said first node on a preset packet forwarding path towards said first node so as to be received by said first node; said destination learning packet having one of the second nodes on the downstream side of said first node on said preset packet forwarding path as a source of transmission; whereby said first node is caused to perform a packet forwarding operation in accordance with said packet forwarding path, wherein, in setting the set of packet handling operations in a second node connected to the first node on said packet forwarding path including said first node, said controller adds to the set of packet handling operations of said second node connected via said first node a processing of rewriting a packet header so that an imaginary address set in a port of the second node will be a transmission source and an imaginary address set in a port of said second node connected via said first node will be a destination, said first node being caused to receive a direction-reversed destination learning packet having said imaginary destination addresses set in the port of said second node connected via said first node as the transmission source and having said imaginary destination address set in the second node connected to the first node as the destination, and wherein said controller causes said first node to receive the destination learning packet at a time interval shorter than an entry holding time interval of said first node.

12. The communication system according to claim 4, wherein said controller causes said first node to receive the destination learning packet at a time interval shorter than an entry holding time interval of said first node.

* * * * *